No. 762,168. PATENTED JUNE 7, 1904.
W. H. H. HEYDRICK.
LAWN MOWER.
APPLICATION FILED AUG. 25, 1903.
NO MODEL.
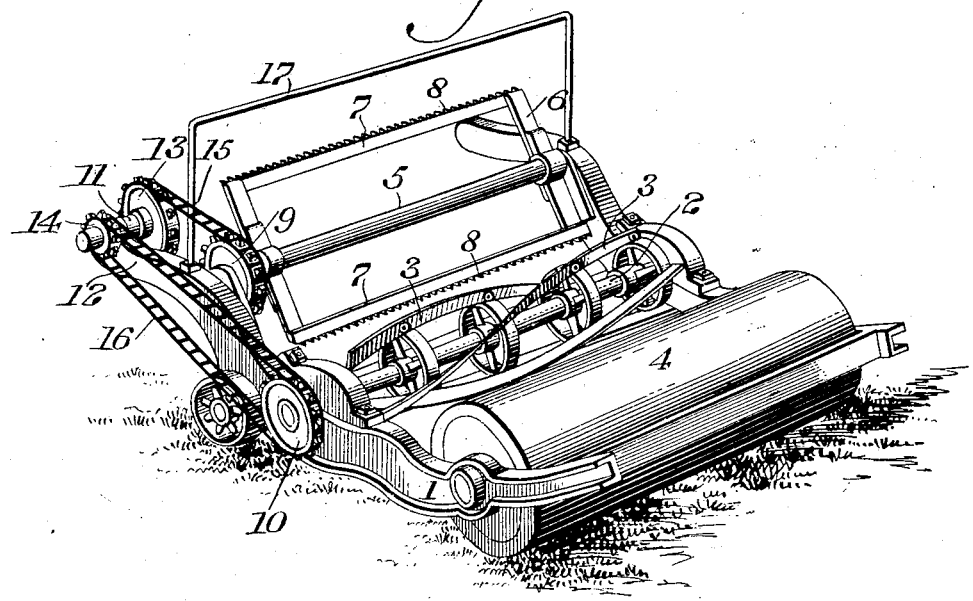
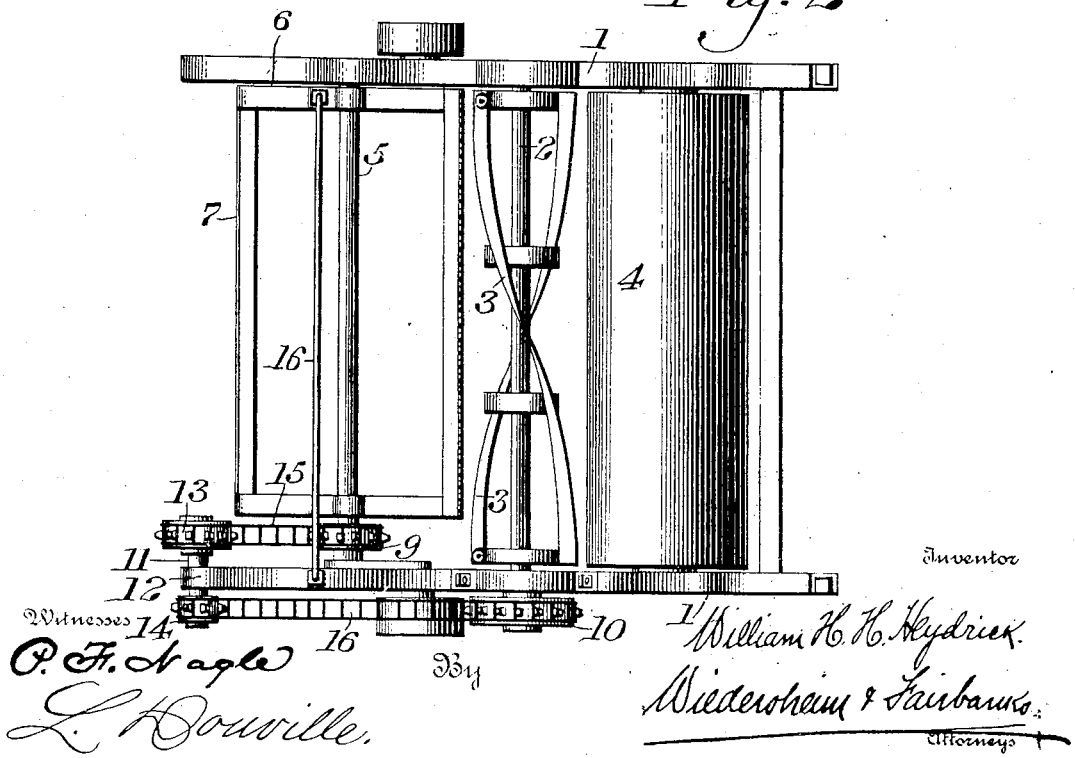

No. 762,168. Patented June 7, 1904.

UNITED STATES PATENT OFFICE.

WILLIAM H. H. HEYDRICK, OF PHILADELPHIA, PENNSYLVANIA.

LAWN-MOWER.

SPECIFICATION forming part of Letters Patent No. 762,168, dated June 7, 1904.

Application filed August 25, 1903. Serial No. 170,676. (No model.)

*To all whom it may concern:*

Be it known that I, WILLIAM H. H. HEYDRICK, a citizen of the United States, residing in the city and county of Philadelphia, State of Pennsylvania, have invented a new and useful Improvement in Lawn-Mowers, of which the following is a specification.

My invention relates to lawn-mowers; and it consists of a novel construction of a beater adapted to buckle and force toward the cutting mechanism tall grass and weeds.

It further consists of novel features of construction, all as will be hereinafter set forth.

Figure 1 represents a perspective view of a mower embodying my invention. Fig. 2 represents a plan view thereof.

Similar numerals of reference indicate corresponding parts in the figures.

Referring to the drawings, 1 designates the frame of a mower, which supports on a shaft 2 the usual rotary cutting mechanism. At the rear of the frame 1 may be rotatably mounted a roller 4, as shown. On a shaft 5, in advance of and above the shaft 2, is mounted a beater 6, consisting, as shown, of a rectangular frame, the transverse bars 7 of which are provided with teeth 8.

Sprocket-wheels 9 and 10 are mounted on the rotary shafts 5 and 2, respectively. A short shaft 11, carried on an extension 12 at one side of the frame 1, has two sprocket-wheels 13 and 14. Chains 15 and 16 connect the wheels 9 and 13 and the wheels 10 and 14, respectively. An arch-shaped wire guard 17, extending above the beater 6, serves to keep the reins from catching in the teeth of the beater.

The operation is as follows: To save complication, I have omitted the draft mechanism and other well-known parts, which form no part of the present invention. It will be seen that the beater is geared to turn in the same direction as the cutter-knives, so that as the machine advances each of its transverse bars engages with a swath of tall grass, weeds, or the like and forces it downwardly and rearwardly toward the cutting mechanism.

Because of the spaces between the bars 7 and because of the serrations or teeth 8 thereon the stalks are not beaten flat before the cutters, but are rather buckled and left standing before the advancing knives.

It will be evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. In a lawn-mower, a frame, a fixed cutter-bar, a shaft supported above and parallel with said bar, rotary cutting-knives on said shaft and coöperating with said bar, and a rotary shaft mounted in said frame above and in advance of said cutting means and provided with a serrated transverse bar adapted to engage with the grass, &c., before the same has been cut.

2. In a lawn-mower, a frame, a fixed cutter-bar, a shaft supported above and parallel with said bar, rotary cutting-knives on said shaft and coöperating with said bar, a rotary shaft mounted in said frame above and in advance of said cutting means, provided with a plurality of serrated transverse bars adapted to engage with the grass, &c., before the same has been cut, and a transverse bar forming a rein-guard above the path of said serrated bars.

WILLIAM H. H. HEYDRICK.

Witnesses:
JOHN A. WIEDERSHEIM,
WM. CANER WIEDERSEIM.